(12) United States Patent
Malthe-Sørenssen et al.

(10) Patent No.: US 6,897,995 B2
(45) Date of Patent: May 24, 2005

(54) METHOD AND DEVICE FOR VARIABLE OPTICAL ATTENUATOR

(75) Inventors: Anders Malthe-Sørenssen, Lysaker (NO); Even Zimmer, Horten (NO); Trond Natestad, Nykirke (NO); Bengt Jacobson, Stockholm (SE)

(73) Assignee: Photonyx AS, Horten (NO)

( * ) Notice: Subject to any disclaimer, the term of this patent is extended or adjusted under 35 U.S.C. 154(b) by 0 days.

(21) Appl. No.: 10/656,009

(22) Filed: Sep. 5, 2003

(65) Prior Publication Data

US 2004/0130773 A1 Jul. 8, 2004

Related U.S. Application Data

(60) Provisional application No. 60/409,126, filed on Sep. 6, 2002.

(30) Foreign Application Priority Data

Sep. 6, 2002 (NO) .......................................... 2002 4265

(51) Int. Cl.[7] .......................... G02B 26/00; G02B 6/00; G02F 1/03
(52) U.S. Cl. ....................... 359/295; 359/291; 359/245; 359/254; 359/262; 359/276; 359/323; 385/140
(58) Field of Search ................................ 359/295, 291, 359/245, 254, 290, 239, 262, 276, 298, 321, 323; 385/40, 140

(56) References Cited

U.S. PATENT DOCUMENTS

| | | | |
|---|---|---|---|
| 3,835,346 A | 9/1974 | Mast et al. | |
| 4,529,620 A | 7/1985 | Glenn | |
| 4,635,082 A | * 1/1987 | Domoto et al. | ............. 347/136 |
| 4,857,978 A | 8/1989 | Goldburt et al. | |
| 4,879,602 A | 11/1989 | Glenn | |
| 4,900,136 A | 2/1990 | Goldburt et al. | |
| 5,116,674 A | 5/1992 | Schmidhalter et al. | |
| 5,221,747 A | 6/1993 | Goe et al. | |
| 5,867,301 A | 2/1999 | Engle | |
| 6,198,566 B1 | * 3/2001 | Takeda et al. | ............... 359/254 |
| 6,369,936 B1 | * 4/2002 | Moulin | ...................... 359/323 |
| 6,456,419 B1 | * 9/2002 | Winker et al. | ............... 359/279 |
| 6,587,288 B2 | * 7/2003 | Erz et al. | ..................... 359/885 |
| 6,661,555 B2 | * 12/2003 | Masuda et al. | ............. 359/245 |

FOREIGN PATENT DOCUMENTS

| | | |
|---|---|---|
| GB | 2265024 | 9/1993 |
| WO | WO 99/09440 | 2/1999 |
| WO | WO 01/48531 | 7/2001 |

OTHER PUBLICATIONS

Guscho, Y., Physics of Reliefography, 1992, Moscos, Nauka, Main Editorial Board for Physical & Mathematical Literature. (Originally published in Russina, English translation §§1, 2.2.3, 7.1–7.9.).

Max Born and Emil Wolf, Principles of Optics: Electromagnetic Theory of Propagation, Interference and Diffraction of Light (7th Edition), Oct. 1999, pp. 38–55, Cambridge University Press, United Kingdom.

* cited by examiner

*Primary Examiner*—Loha Ben
(74) *Attorney, Agent, or Firm*—Knobbe Martens Olson & Bear LLP

(57) ABSTRACT

A variable optical modulator for optical communication systems using a tunable dynamic grating comprises a gel or membrane layer attached adjacent to a prism communicating light to/from the optical communication system. A substrate has a plurality of individually addressable electrodes and drive means for providing regulated excitation voltage to each of the plurality of electrodes, thereby generating a wave pattern on a surface of the gel or membrane superimposed on an initial state of the gel or membrane layer.

14 Claims, 13 Drawing Sheets

|—10mm—|

3mm

METHOD AND DEVICE FOR VARIABLE OPTICAL ATTENUATOR

CROSS REFERENCE TO RELATED APPLICATION

This application claims priority under 35 U.S.C. § 119(e) to U.S. Provisional Patent Application 60/409,126 entitled "METHOD AND DEVICE FOR VARIABLE OPTICAL ATTENUATOR" and filed on Sep. 6, 2002. The disclosure of the above-described filed application is hereby incorporated by reference.

BACKGROUND OF THE INVENTION

1. Field of the Invention

The present invention relates generally to a device and a method, as well as uses thereof, of a Variable Optical Attenuator (VOA), and specially for controlling the intensity of light in an optical fiber by use of a tunable dynamic grating in a optical communication systems.

2. Description of the Related Art

The demand for bandwidth for communication and information exchange has been growing exponentially. The growth has particularly accelerated by the introduction of Wavelength Division Multiplexing (WDM) technology used to multiplex optical signals along the same optical fiber by use of different wavelengths in narrow bands with minimal dissipation. Active components are needed in addition to the passive fibers, in order to generate, amplify, route, and filter signals. This has lead to the development of a wide range of technologies to manipulate light in optical fibers, such optical components includes filters, switches, amplifiers, and attenuators. However, the high cost of components, in particular for the more advanced components including many subparts, are inhibiting the speed of deployment of optical communication systems, and the introduction of all optical networks. Consequently, it is necessary to develop cost effective components that have the necessary specifications, but allow low cost assembly and production method to be used. Optical communication systems are used in telecommunication systems, local area networks, wide area networks, television networks, instrumentation networks, etc. and all other types of communication systems where communicating symbols, messages and signals and its like is best provided for by optical means.

A component of particular demand in fiber optical communication systems is the variable optical attenuator. Attenuators are used as stand-along components for example to compensate for aging effects in other components, and to avoid saturation of detectors. However, for a more dynamic network structures, such as in an all-optical network, the signal strengths in the system from various sources or from various pathways will vary widely, and the need for reconfigurable or dynamic variable optical attenuators arise. Variable optical attenuators are also an important subpart of modules such as equalizers and optical add/drop multiplexers. For such applications, it is particularly the scalability of the technology that will determine the end price of the module.

Several embodiments have been suggested for tunable diffraction gratings with applications to fiber optical components. One of the known methods is diffractive MEMS (D-MEMS). This technology is available from Light Connect and Silicon Light Machines, for example. These devices are based on a moveable diffraction grating consisting of at least two separate pieces. A stationary reflective bottom surface, a moveable set of thin blades, and the grating are made of etched silicon. The blades can be moved up and down by the application of an appropriate electrical field. The result is a diffraction grating, where the effective phase shift of the grating is given by the relative position of the blades and the reflective surface below. This allows the grating to be turned on and off with a response time of only a few milliseconds. However, the voltages required to displace the blades are still high, on the order of tens to hundreds of Volts. This arrangement can be used to make effective variable optical attenuators, but the set of blades must be processed out of silicon. This is an expensive process, and the yield of the process goes dramatically down as the system size is increased. Components made from D-MEMS are hence effective, but expensive.

SUMMARY OF CERTAIN INVENTIVE EMBODIMENTS

In one aspect of the invention a method of modulating light in an optical communication system comprises transmitting light through a gel membrane positioned adjacent to a surface of a transparent prism, wherein a plurality of individually addressable electrodes are positioned on a substrate opposite the prism and spaced apart from a surface of the gel membrane such that a gap exists between the electrodes and the surface of the gel membrane, applying an excitation voltage to each electrode, thereby generating a wave pattern on a surface of the gel membrane superimposed on an initial state of the gel membrane, and regulating the excitation voltages applied to the electrodes such that the gel membrane returns to the initial state in response to removal of the excitation voltages.

The method can further comprise providing light to or receiving light from the optical communication system through an optical fiber attached to the prism. In an additional aspect of the invention, the prism can be positioned over the substrate such that a direction of the prism top is perpendicular to a direction of the electrodes on the substrate. Alternately, the prism can be positioned over the substrate such that a direction of the prism top is parallel to a direction of the electrodes on the substrate.

In yet another aspect of the invention a device for modulating light in an optical communication system comprises a prism transmitting light to/from the optical communication system, a gel membrane positioned adjacent to a surface of the prism, a substrate having a plurality of individually addressable electrodes located at a distance from a surface of the gel membrane opposite the prism surface, wherein a gap exists between the electrodes and the surface of the gel membrane, an excitation voltage source configured to provide regulated excitation voltage to each of the plurality of electrodes, and configured to generate a wave pattern on a surface of the gel membrane superimposed on an initial state of the gel membrane, wherein the excitation voltage source comprises a compensating device configured to cause the gel membrane to return to the initial state upon removal of the excitation voltages.

The device can further comprise at least one optical fiber attached to the prism and configured to provide light to/from the optical communication system. In certain aspects of the invention, the prism is positioned over the substrate such that a direction of the prism top is perpendicular to the electrodes on the substrate. Alternately, the prism is positioned over the substrate such that the direction of the prism top is parallel to the electrodes on the substrate.

In additional aspects of the invention, the excitation voltage source is further configured to provide different voltages to each of the plurality of electrodes. In addition, the excitation voltage source can be configured to provide individual voltages to each of the plurality of electrodes.

In yet another aspect of the invention, the electrodes are arranged in at least three adjacent parallel rows comprising equal numbers of addressable electrodes, thereby configured to generate at least three wave patterns at the same time on the surface of the gel membrane, and thereby providing a means of optically summing reflected or attenuated light from at least the three wave patterns on the gel membrane.

In yet another aspect of the invention, every other electrode on the substrate is connected to ground while a voltage is applied to the other electrodes, and wherein the arrangement is periodically reversed such that a voltage is applied to the grounded electrodes while the other electrodes are grounded.

In an additional aspect of the invention, the device further comprises a photodiode or a phototransistor configured to measure a level of light output from the prism, and further configured to provide a correction signal to the compensation means. The device can also comprise a memory of target voltages for the plurality of electrodes, wherein the memory is in communication with the compensating means.

An aspect of the present invention is based on the incoming light being reflected from a surface that is itself spatially modulated and therefore perfectly plane only for the case when full TIR is desired.

Another aspect of the present invention is that the spatially modulated surface and/or its surface coating (if present) are/is therefore always in touch with the non-evanescent field of the incoming light.

Yet another aspect of the present invention is that no part of the incoming light is absorbed in the component: All of the light intensity propagates out of the component, but the direction is controlled by the surface modulation of the gel.

Yet another aspect of the present invention is that it allows the light in the $0^{th}$ order to be tuned continuously from full intensity to an attenuation of 20 dB, or even more for multi-pass configurations. With a combination of driver electronics and optical solutions to send the light into and collect the light from the modulators, the present invention provides tunable surface diffraction grating methods and devices used for applications such as variable optical attenuators in optical fiber telecommunication systems.

BRIEF DESCRIPTION OF THE DRAWINGS

FIG. 1B is a cross-section illustration of a portion of the modulator of FIG. 1A.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

The present invention aims to have the performance of D-MEMS solutions, but with the same ease of manufacturing as found in LCD or LCOS methods of production. The present invention is based on tunable surface diffraction gratings. Such gratings have been disclosed in the literature. For example, embodiments of a VOA as described herein are based on the arrangement described in articles and books published by Guscho in Russia. (Guscho: Physics of reliefography, 1992 Nauka Moscow) and in international publication number WO 01/48531 by Yuri Guscho. These examples of optical systems are mainly applications concerning projector technology. However, embodiments according to the present invention can also be based on modulators with surface coatings, as described by Engle (U.S. Pat. No. 5,867,301). The basic principles of these modulators are well known, and have been used for projection applications since the introduction of the Eidophor project almost 50 years ago. However, for projection applications, the contrast for the light on the screen is important. Consequently, these applications have relied on using the light in the $1^{st}$ and the $2^{nd}$ diffraction orders. For applications in fiber optical components, the light in the $0^{th}$ order is used instead.

Figure 1A:
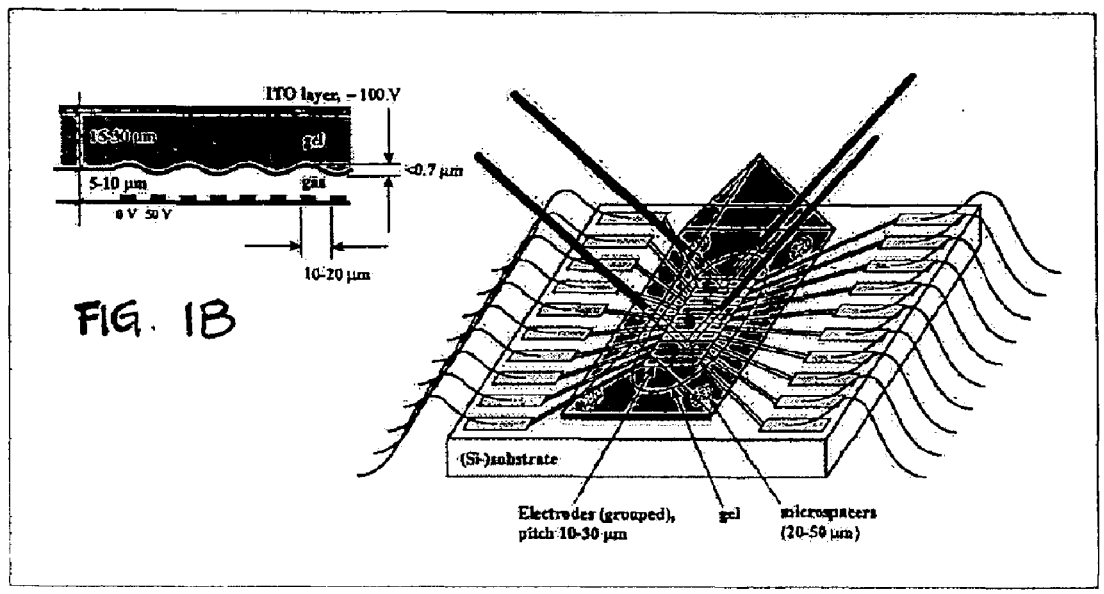
FIG. 1A is an illustration of one embodiment of a modulator.
Figure 2:
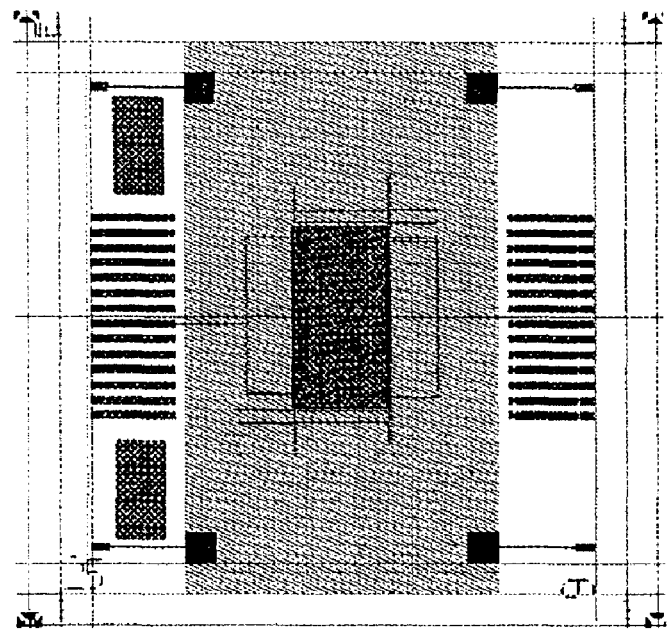
FIG. 2 is an illustration of one embodiment of a silicon substrate layout for a modulator.

British patent application No. GB 2 265 024 describes a spatial light modulator assembly provided by an assembly comprising a deformable material layer deformable in response to variation in an electrostatic field temperature or potential difference. The solution described in this patent application is based on the physical phenomenon of frustrated total internal reflection from a surface that is never modulated and therefore always perfectly flat. "The advantages of the assemblies of FIGS. 1 and 2 are that the read in beam only sees a flat surface which is the interface 7 and does not travel through or reflect off a physically deformed surface as in conventional modulator assemblies using a deformable layer." See p. 11 (bottom) and p. 12 (top).

The incoming read beam has such an incident angle to the plane surface 7 that total internal reflection (TIR) is achieved. TIR is characterized by the existence of a so-called evanescent field on the side of the reflecting surface that is opposite to the incoming beam. This field does not represent any transport of energy, but is proportional to the expression $e^{(-2p \cdot z/\lambda)}$ where z represents the distance to the reflecting surface 4, and $\lambda$ is the optical wavelength in the gaseous medium 6 (see p. 50 in $7^{th}$ edition of 'Principles of Optics' by Max Born and Emil Wolf, Cambridge University Press). The effective depth of penetration into the gaseous medium 6 is of the order of $\lambda/2\pi$ which is less than the optical wavelength.

A modulated surface is present in the vicinity of the reflecting surface, but on an opposite side of it relative to the incoming read beam. As a gaseous medium 6 is described to exist between 7 and 10, the deformable material 5 and/or the layer 10 are/is in contact only with the evanescent field of the read beam. It is the evanescent field of the read beam that experiences the local spatial modulation of refractive index and thereby a local spatial modulation of the local index of refraction. "Amplitude modulation of the read in beam 2 is brought about by local spoiling of the total internal reflection condition (TIR) of the beam undergoing total internal reflection at the interface 7 between the first layer 1 and gaseous medium in the gap 6 . . . . This spoiling of the total internal reflection condition leads to the condition of frustrated total internal reflection and a local change in the reflection coefficient of the laser beam at that point." Page 8, last paragraph; page 9, first paragraph.

The part of the incoming light beam that is not reflected out due to the frustrated TIR, is transmitted through layer 7 and absorbed by subsequent layers and/or coatings (see middle of p. 3).

An aspect of the invention is based on the incoming light being reflected from a surface that is itself spatially modulated and therefore perfectly plane only for the case when full TIR is desired.

Another aspect of the invention is that the spatially modulated surface and/or its surface coating (if present) are/is therefore always in touch with the non-evanescent field of the incoming light.

Yet another aspect of the invention is that no part of the incoming light is absorbed in the component; all of the light intensity propagates out of the component, and the direction is controlled by the surface modulation of the gel.

Yet another aspect of the present invention is that it allows the light in the $0^{th}$ order to be tuned continuously from full intensity to an attenuation of 20 dB, or even more for multi-pass configurations. With a combination of driver electronics, and optical solutions to send the light into and collect the light from the modulators, certain embodiments of the invention provide tunable surface diffraction grating methods and devices used for applications such as variable optical attenuators in optical fiber telecommunication systems.

Certain embodiments of the invention are based on light diffraction due to surface modulation in a thin gel layer or a membrane with equal optical and functional characteristics. One embodiment of a modulator is illustrated in FIGS. 1A–B. The modulator comprises a thin layer of gel (or membrane) attached to a transparent prism. The gel membrane is index matched to the prism glass, and the gel has low light absorption in both the visible and the infrared range (less than 2% for a typical system). Typically, the gel layer is 15–30 micrometers thick. Electrodes are processed on a flat substrate layer (FIG. 2) separated from the gel surface by a thin air gap (5–10 micrometers thick). The spacing can be arranged differently as known to a person skilled in the art.

A bias voltage is applied across the gel and the air gap. As a result, a net force acts on the gel surface due to the electric field. In addition it is possible to individually address each signal electrode. By applying a local signal voltage, forces are applied to the gel surface, resulting in a surface modulation. The elastic surface response is rapid, with a response time of tens of microseconds. However, various charging and relaxation processes also occur on longer time scales in the gel, resulting in a slow drift in the surface modulation in the range from microseconds to minutes. Some embodiments of the invention include arrangements of feedback for stable operation, which will be described further hereinafter.

The typical dimension of the active area (electrodes) of the embodiment of a modulator as shown in FIG. 2 is 3 mm×6 mm. The electrodes are positioned as interlacing combs with 125 line pairs/mm as maximum resolution in this embodiment. The resolution limit is due to the high precision necessary for the low gel thickness and narrow air gap which are advantageous for high density surface modulation.

A periodic variation of the driving voltages produces an approximately sinusoidal modulation with the same period as the voltages. Typical values for the bias and the driving voltages applied on the electrodes are 100 V.

When light is reflected off the modulated surface the modulator acts as a diffraction grating. To reduce polarization effects and transmission losses, a conical diffraction setup is used for high line densities. The incoming direction of the light beam is parallel to the electrode lines and the corresponding grooves of the surface modulation. The result is that the light is diffracted into higher diffraction orders.

Figure 3:
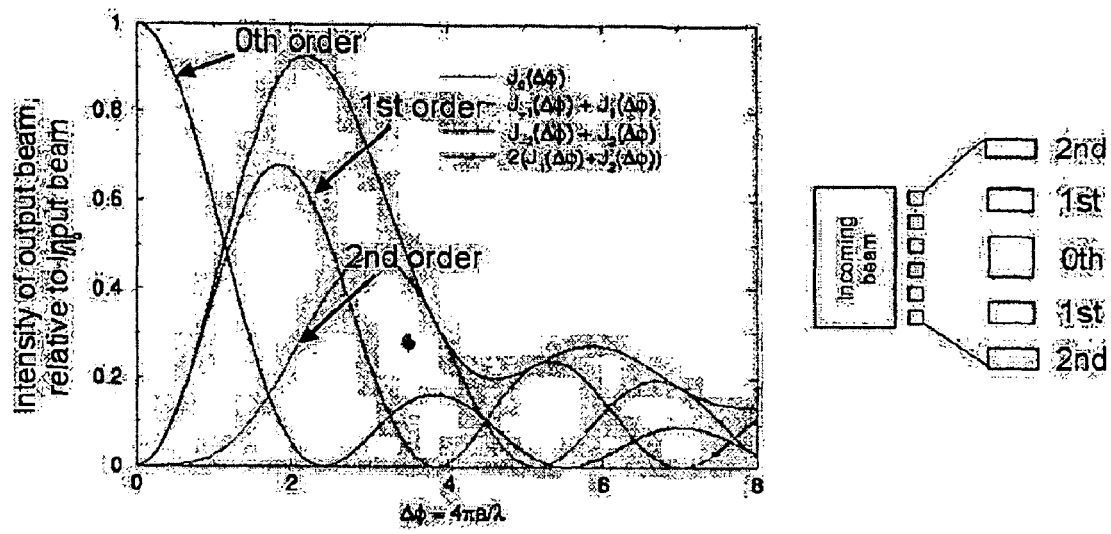
FIG. 3 is a graphical illustration of intensities of diffraction orders based on theoretical calculations.

FIG. 3 is a graphical illustration showing the intensity in the $0^{th}$, $1^{st}$, and $2^{nd}$ diffraction orders based on theoretical calculations. The intensity is wavelength dependent, and to first order the phase shift is proportional to $a/\lambda$, where a is the amplitude of the surface modulation and $\lambda$ is the wavelength of the light. The variation of wavelength of the C-band will typically give a variation of attenuation of 1%. Thus, the best zero level for an off switch will be worse than 1% over the whole C band. By varying the surface modulation amplitude, the attenuation of the $0^{th}$ order can be varied continuously. For 1550 nm light, a surface modulation amplitude of 300 nm is needed to reach full attenuation in the $0^{th}$ order. As can be seen from FIG. 3, the maximum intensity in the $1^{st}$ order at full attenuation in $0^{th}$ order is approximately 30% (for one of the maxima).

If the prism is 5 mm high and 10 mm wide, 1554 nm light is used, and the prism index is 1.45, the following distances can be been measured on the prism facet:

Distance between $0^{th}$ and $1^{st}$ order is 0.67 mm.

Distance between $1^{st}$ and $2^{nd}$ order is 0.70 mm.

These distances define the positions for the coupling of an optical fiber to the prism surface, which is done as known to a person skilled in the art.

Different Arrangements of the VOA

Figure 4:
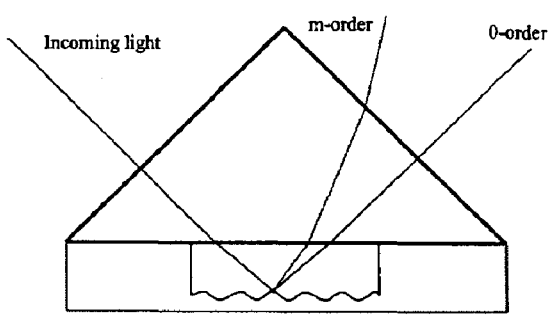
FIG. 4 is a side-view illustration of one embodiment of a modulator.

The gel arranged modulator is a programmable diffraction grating. The grating may be arranged comprising a sinusoidal gel relief with variable amplitude. An electric field generated by electrodes controls the amplitude of the gel, and the spacing between the electrodes gives the period of the grating. The modulator is a reflection grating and has an incidence angle of 45°, as illustrated in FIG. 4. Depending on the orientation of the incoming light beam, the diffraction can be conical or in-plane diffraction.

Configuration 1: Conical Diffraction

Figure 5:
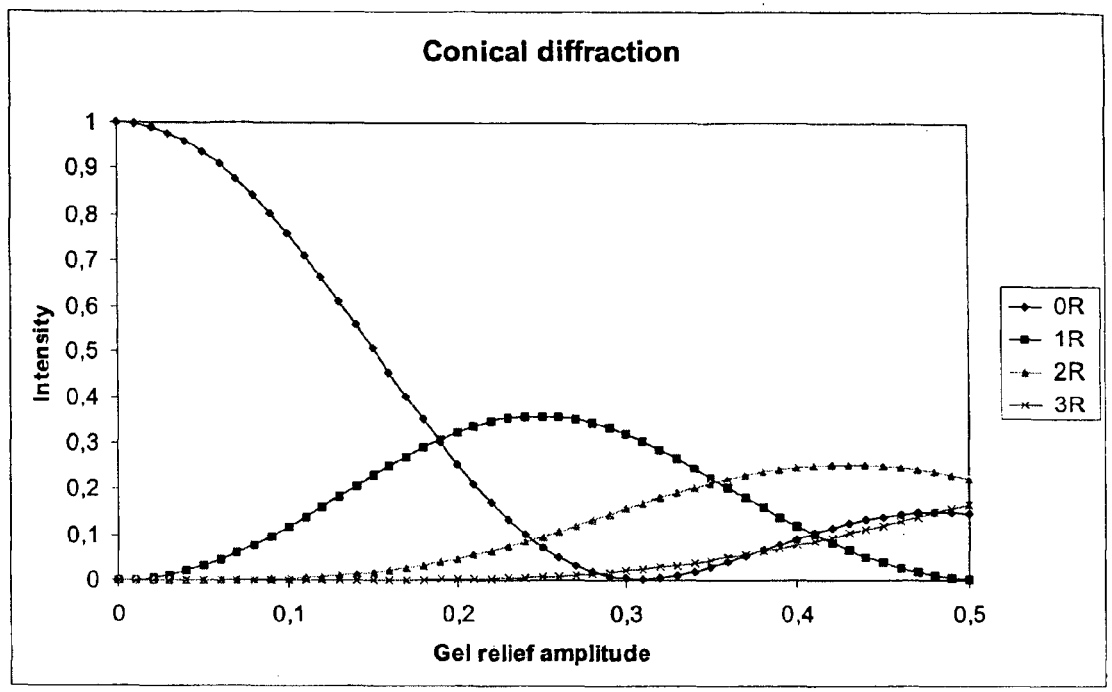
FIG. 5 is a graphical illustration of the intensity of different diffraction orders as a function of gel relief amplitude for conical diffraction.

Conical diffraction occurs when the prism top is perpendicular to the electrode lines. FIG. 5 shows the intensity of different diffraction orders as a function of gel relief amplitude. The period of the grating is eight micrometers, which corresponds to 125 lines/mm.

Advantages of conical diffraction are that all light will be reflected by the grating, and no light will be transmitted through the gel, the configuration is less dependent on the polarization of the incoming light, and the $0^{th}$ order can be reduced to be very close to zero.

Configuration 2: Oblique In-plane Diffraction

Figure 6:
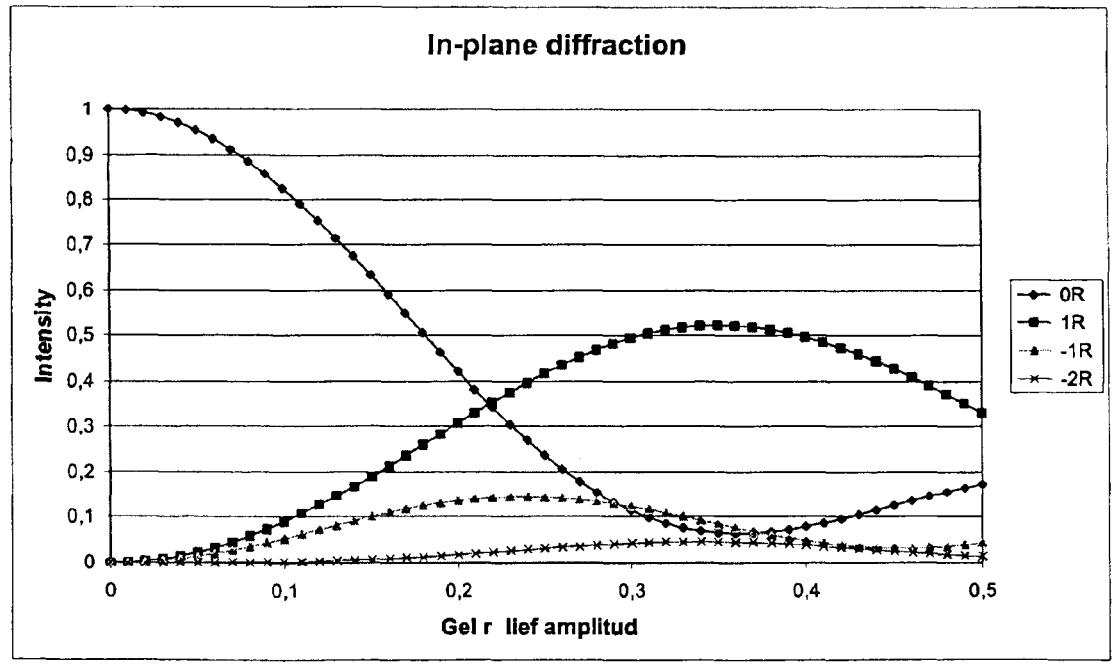
FIG. 6 is a graphical illustration of the intensity of different diffraction orders as a function of gel relief amplitude for in-plane diffraction.

Oblique in-plane diffraction occurs when the prism top is parallel to the electrode lines. FIG. 6 shows the intensity in different diffraction orders as a function of gel relief amplitude. The period of the grating is eight microns, which is corresponds to 125 lines/mm.

Advantages of in-plane diffraction are that the orientation of the diffraction orders is on a straight line, which makes a modulator with in-plane diffraction easy to design and assemble. In addition, the positive and negative diffraction orders are asymmetrical, and an asymmetrical behavior will give higher intensity in some orders, which is efficient for a switch device.

Figure 7:
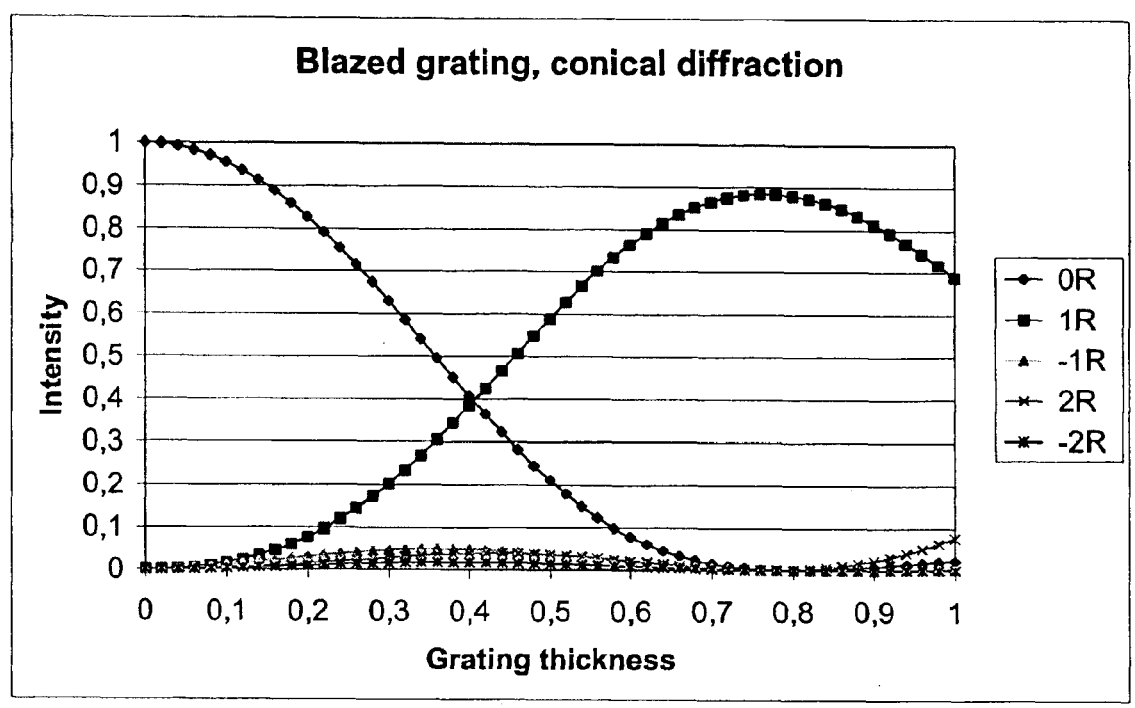
FIG. 7 is a graphical illustration of the intensity in each diffraction order as a function of the blazed grating thickness for conical diffraction.

In another embodiment, the gel relief is changed from a sinusoidal shape to a skew triangular shape, and new diffraction properties occur. A grating with a skew triangular shape is called a blazed grating. In a blazed grating almost all light will be distributed between the $0^{th}$ and a specific diffraction order. With these characteristics the modulator can work as a switch. FIG. 7 shows the intensity of each diffraction order as a function of the gel relief thickness for a blazed grating.

It can be advantageous for some applications of tunable surface diffraction gratings in the telecommunication area to direct as much diffracted light as possible into an input optical fiber. However, there is a symmetrical distribution of an output light power in diffraction orders. For example, maximum intensities of light in ±1 diffraction orders are equal to 33.9% in the +1 order and 33.9% in the −1 order (for monochromatic light and harmonic relief on a gel layer surface). To obtain an asymmetrical distribution of light in diffraction orders, an asymmetrical relief can be used. One possible shape of such relief is a saw-tooth profile.

Mathematical Approach

Figure 18:
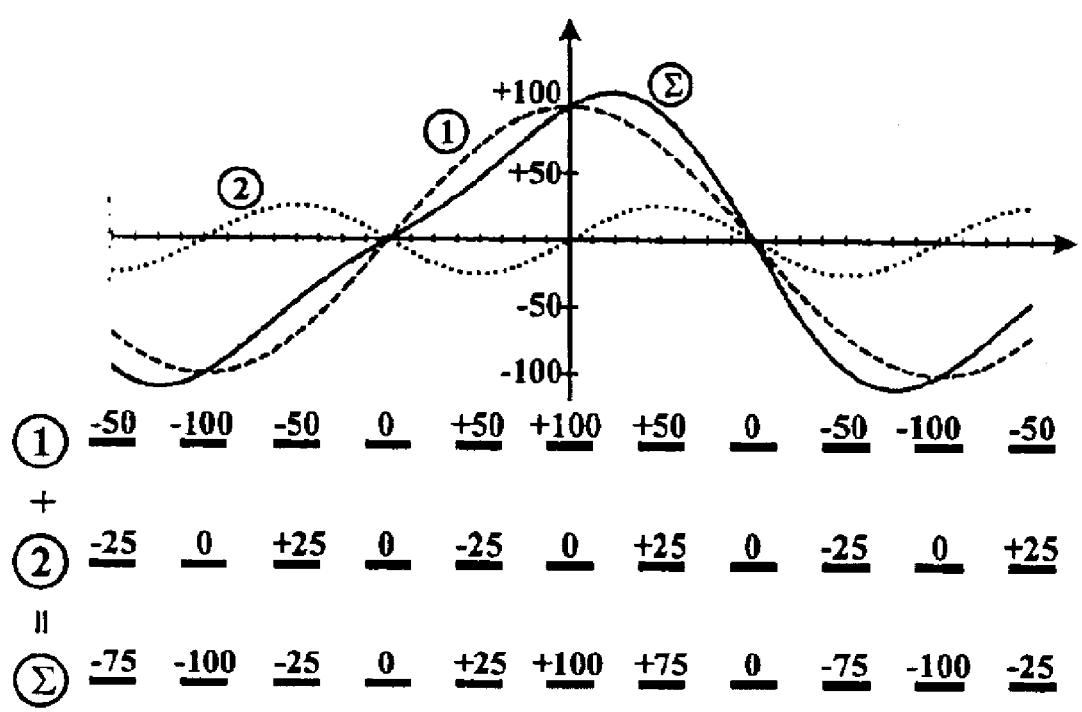
FIG. 18 is a graphical illustration of a saw-tooth profile according to one embodiment of the invention.

The most primitive saw-tooth profile can be obtained as a sum of two harmonics as it follows from Equations (1)–(3) and FIG. 18.

$$F_\Sigma(x) = F_1(x) + F_2(x), \quad (1)$$

$$F_1(x) = 100\cos\left(\frac{2 \cdot \pi}{16} x\right), \quad (2)$$

$$F_2(x) = 25\cos\left(\frac{2 \cdot \pi}{8} x - \frac{\pi}{2}\right). \quad (3)$$

If the amplitude of the second term $F_2(x)$ is less than 20 or more than 30, it will result in a less desirable saw-tooth shape as compared with FIG. 18. The same is valid for the phase shift of the second term, and the value $\pi/2$ provides the most desirable saw-tooth profile.

Practical Implementation

The saw-tooth profile (FIG. 18) of a potential distribution in the plane of electrodes can be obtained with the electrode structure shown in FIG. 18 under the plots. Bold dash lines symbolize linear electrodes, and a value over each stroke is a voltage applied to this electrode. The upper line corresponds to the term $F_1(x)$, the middle line represents $F_2(x)$, and the bottom line is the sum $F_\Sigma(x)$.

It should be taken into consideration that the saw-tooth profile of a potential distribution in the plane of electrodes shown in FIG. 18 will not form a relief with the identical shape. The amplitudes of spatial harmonics of a potential distribution decrease from the plane of electrodes to the gel layer surface. The rate of decrease is approximately two times higher for harmonic term $F_2(x)$ because it has two times larger spatial frequency (two times less spatial period). Also, the amplitude of a harmonic relief caused by a harmonically distributed ponder motive force decreases with increased spatial frequency (or stays the same with a decreased spatial period) for a constant amplitude of the force.

Thereby, the amplitude of the first spatial harmonic of a relief $A_1(x)$ (caused by the first spatial harmonic $F_1(x)$ of a potential) will not be 100/25=4 times, but, for example, 6–8 times larger compared to the amplitude of the second spatial harmonic $A_2(x)$ (caused by $F_2(x)$). Also, the sum $A_1(x)+A_2(x)$ will have a less than desirable saw-tooth shape as compared with the sum $F_1(x)+F_2(x)$.

To compensate for a higher rate of decrease in the amplitude of $F_2(x)$, a greater amplitude can be used for $F_2(x)$. It will not correspond to a less than desirable saw-tooth shape of the potential distribution in the plane of electrodes, but to a "normal" (FIG. 18) saw-tooth shape of a relief.

Driving Modes

A potential problem that occurs when driving the above-described embodiments is a memory effect. The gel gets caught in its shape if it stays there for a long time. To get rid of the memory effect, different approaches can be used.

Alternating Mode

The electrodes are configured so that every other has a voltage applied and every other is grounded. A sinusoidal grating period is created by one grounded electrode and one electrode with a voltage applied. By inverting the configuration in a periodical way it is possible to get rid of the memory effects. However, during the switching time the light sent trough the modulator cannot be controlled, and an arrangement with this method advantageously includes an on/off optical shutter device, as known to a person skilled in the art, in the path inhibiting unwanted light in a telecom application.

Rolling Alternating Mode

The rolling alternating mode will switch between the two different driving voltages at a few places at one time. Information can continuously be sent through the modulator. Problems with phase shift can be compensated in subsequent devices in the path.

Static Mode with Feedback

In a static driving mode, a memory effect will occur, but with a feedback controlling system the driving signal can be compensated for the memory effect.

When a gel modulator is subject to an excitation voltage, a wave pattern on the gel surface is set up, which is used to deflect or attenuate optical signals. When the excitation voltage is removed, the gel will not immediately return to the initial state.

The result of memory effect is that there will not be a predictable relation between the attenuation achieved and the applied excitation voltage in a VOA application of the gel modulator.

Figure 13:
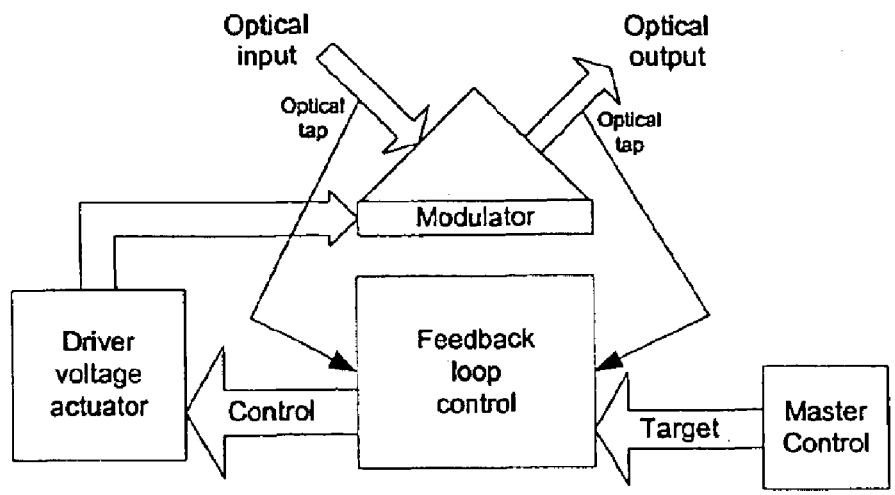
FIG. 13 is a block diagram of one embodiment of a feedback system.

Therefore the measured attenuation level of the VOA is used as a feedback signal for controlling the excitation voltage of the modulator. One embodiment of a feedback system is shown in FIG. 13.

The master control unit supplies the attenuation target value to the feedback control unit. The optical input and output are measured, and the feedback loop control unit measures the attenuation of the modulator. This attenuation value is compared to the target value, giving a correction signal. The driver voltage is adjusted based on this correction signal.

Figure 14:
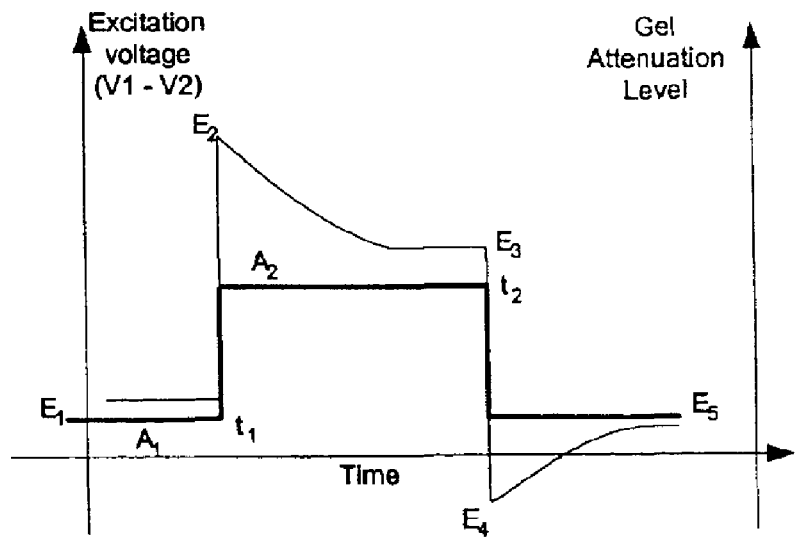
FIG. 14 is a graphical illustration of a typical operation sequence in the feedback system of FIG. 13.

A typical operation sequence is shown in the graphical illustration of FIG. 14. The left-hand axis shows the voltage difference between the excitation electrodes $E=V1-V2$. The right-hand axis shows the gel attenuation level A. Initially, the attenuation is $A_1$, with a steady-state excitation voltage of $E_1$. At $t_1$, the master control unit receives a new target level $A_2$. The feedback control unit adjusts the excitation voltage to $E_2$ to achieve the new target value. Due to the memory effect in the gel, the excitation voltages will over time drop to a steady-state level $E_3$. At $t_2$, the master control unit switches the target value back to $A_1$. Due to the memory effect, the feedback reduces the excitation voltage to $E_4$. $E_4$ may be negative, indicating that the V2 electrode is positive with respect to the V1 electrode. After some time, the excitation voltage will approach a steady-state value $E_5$.

Embodiments of the invention provide gel technology as an advanced material platform that has the potential to generate several electrically tunable telecom products. To comply with requirements from telecom applications, conical diffraction (low insertion loss, low polarization dependant loss) and static driving mode with feedback (high accuracy, no data loss) are preferred operating modes.

Three core functions can be implemented with these methods according to the invention: light modulation, spectral filtering, and optical switching. The following exemplary VOA embodiments demonstrate these functions.

VOA Based on 125 l/mm Substrates

One embodiment of a VOA includes variable attenuation, variable coupler/tapper (switch), and spectral selectivity/filter, monitoring (feedback).

Figure 8A:
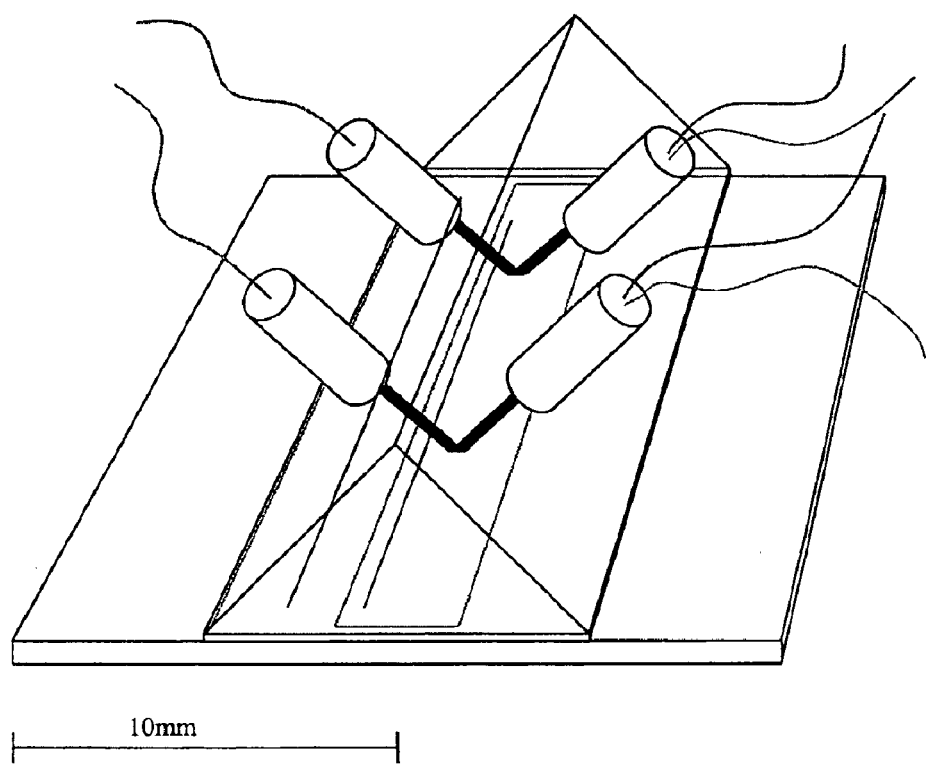
FIG. 8A is an illustration of one embodiment of a VOA wherein the electrode lines are parallel to the direction of the prism top.
Figure 8B:
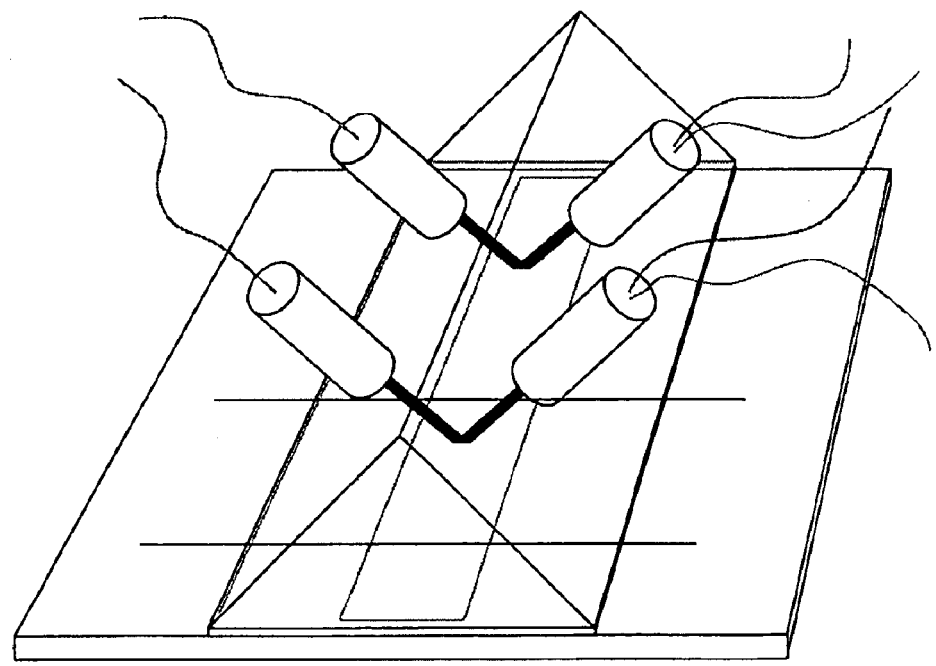
FIG. 8B is an illustration of one embodiment of a VOA wherein the electrode lines are perpendicular to the direction of the prism top.

The VOA of FIGS. 8A–B comprises an array of two attenuators with on-chip monitoring functions. It includes two incoming fibers and four outgoing fibers. The +1 and −1 orders could be used as tapers to deflect a limited part of the energy to monitor the power in each incoming channel. Spectral selectivity can also be implemented by using the angular selectivity of collimating optics.

Feedback from the +1 and −1 orders is used to increase the attenuation range and optimize accuracy.

Embodiment Based on 33 l/mm Substrates 33 l/mm substrates are simple and cheap to manufacture, and should therefore also be considered. In such a case, the very small angular separation of the diffracted beams makes the practical fabrication of 4 fiber-couple outputs extremely difficult. Therefore, an embodiment of a VOA with a "33 l/mm" modulator is based on two input and two output channels, neglecting higher diffraction orders.

Figure 9:
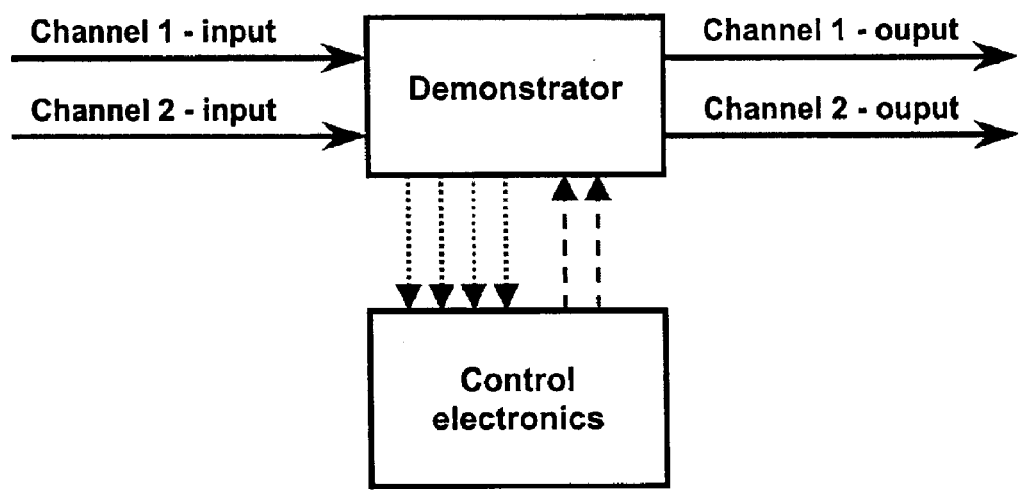
FIG. 9 is a block diagram of one embodiment of a modulator based on 33 l/mm substrates.
Figure 12:
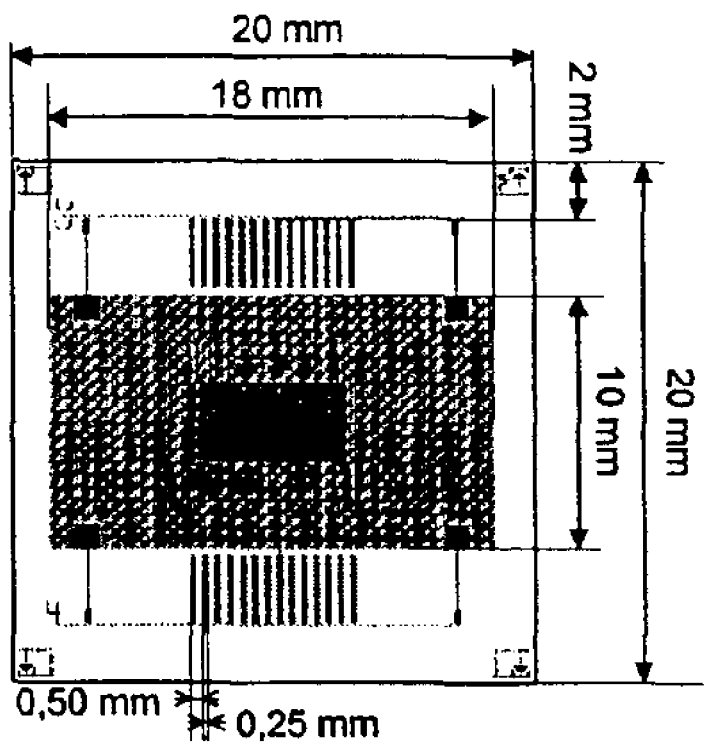
FIG. 12 is a layout illustration of a substrate of the modulator of FIG. 9.

The device comprises a modulator, with the possibility to control the gel relief for two channels, and a programmable control electronics board to control the attenuation levels of both channels with a feedback loop. The control electronics can comprise, for example, photodiodes and transistors. A block diagram of the present embodiment of a VOA is provided in FIG. 9 and the layout of the substrate is shown in FIG. 12, wherein the grating pitch is 33 lines/mm and the active area is 3×6 mm.

Two photodetectors per channel will provide information on optical power levels at the input and at the output of the modulator. The control electronics uses this information to optimize the voltage levels applied to the gel in order to accurately attenuate the signals in both channels according to a nominal value.

Two main embodiments are possible, wherein the first embodiment is the variable optical attenuator and the second embodiment is the dynamic channel equalization embodiment.

1. Variable Optical Attenuator

Two main functions are required. First, the user defines an output value of the optical power for each channel and input means transfers the value to the control electronics that optimizes the voltage levels to attenuate the signal until the required optical power level has been obtained.

Example: $P_{in}$(channel 1)=12 mW, $P_{in}$(channel 2)=10 mW
User settings: $P_{out}$(channel 1)=6 mW, $P_{out}$(channel 2)=0.1 mW The modulator and control electronics attenuate both signals until the user settings have been reached, i.e., 6 mW in the $1^{st}$ channel and 0.1 mW in the second channel. The values from the two output photodiodes are used for optimization in the feedback loop.

Second, the user defines an output value of the attenuation for each channel. The control electronics optimize the voltage levels to attenuate the signal until the required attenuation level has been obtained.

Example: $P_{in}$(channel 1)=12 mW, $P_{in}$(channel 2)=10 mW
User settings: attenuation (channel 1)=3 dB, attenuation (channel 1)=20 dB The modulator and control electronics attenuate both signals until the user settings have been reached, i.e., 6 mW in the $1^{st}$ channel and 0.1 mW in the second channel. The ratios of the values given by the input and output photodiodes in each channel are used for optimization in the feedback loop.

1. Dynamic Channel Equalization

This embodiment provides dynamic channel equalization. Two channels with varying intensities over time are sent to the device. The device dynamically identifies and attenuates the channel with the highest optical power until both channels are equalized. Equalization is performed within 1 ms.

Finally, in another embodiment, it can be advantageous to connect the two channels in series to obtain higher attenuation range.

Polarization Dependent Losses

The measured values of Polarization Dependent Loss (PLD) are slightly high for some of the described embodiments. As a result several double or multi-pass configurations can be used to counteract the PLD.

Figure 10A:
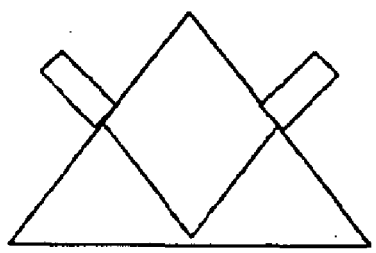
FIG. 10A is a side view illustration of a double pass configuration of a modulator using the Fraunhofer approximation.
Figure 10B:
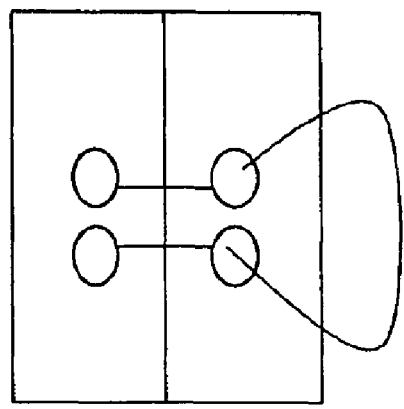
FIG. 10B is a top view illustration of a double pass configuration of the modulator of FIG. 10A.

There are two conceptual ways to use a multipass configuration for the modulator. The first way is to pick up the $0^{th}$ order after the first diffraction and then let this order be diffracted one more time. The output will be the square of the 0$^{th}$ order intensity. This provides the opportunity to obtain a very high attenuation. To be able to pick up only the 0$^{th}$ order, a lens or collimator is advantageously used to obtain the Fraunhofer approximation. FIGS. 10A–B illustrate a modulator with a double pass configuration using the Fraunhofer approximation, where a fiber is used to connect the two-collimator pairs.

Figure 11:
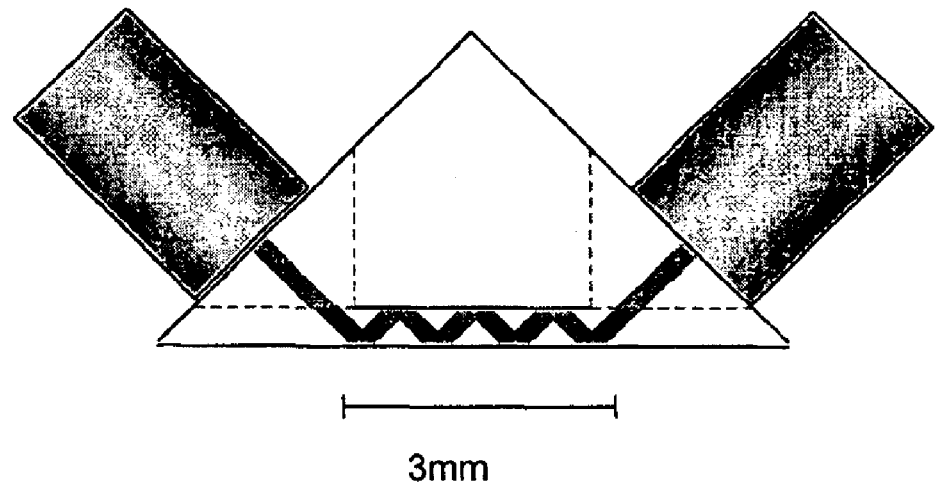
FIG. 11 is an illustration of a Fresnel multiple-pass configuration of a modulator with mounted collimators.

Another way to implement a multipass configuration is to mirror back the diffracted beam and diffract it again. In this case, the distance between the two diffractions is very close and the Fresnel approximation is used. With this type of arrangement, the total phase shift will be the sum of all phase shifts that occur when the light beam hits the diffraction pattern. If the beam hits the diffraction pattern n times the gel amplitude must be n times lower, and the electrical field must be approximately n times smaller. FIG. 11 is an illustration of a Fresnel multiple-pass configuration with mounted collimaters. The beam is 0.4 mm, the collimaters are 2.8 mm in diameter, and the glass thickness where the multipass is located is 0.7 mm.

Other Applications

1×2 Switch

A 1×2 switch may be realized by fixing collimators at the 0$^{th}$ and at one of the 1$^{st}$ order positions. By switching the grating on and off, the light will be switched from one position to the other. (By tuning the amplitude, this could also serve as a variable tap). A sketch of one embodiment of a 1×2 switch is illustrated in FIG. 15A.

However, based on the intensity distribution of the different diffraction orders of a sinusoidal grating, a modulator with conical geometry will have maximum intensity of one of the first orders at about 30%, and this is not when the 0$^{th}$ order is at the minima.

Figures 15A, 15B:
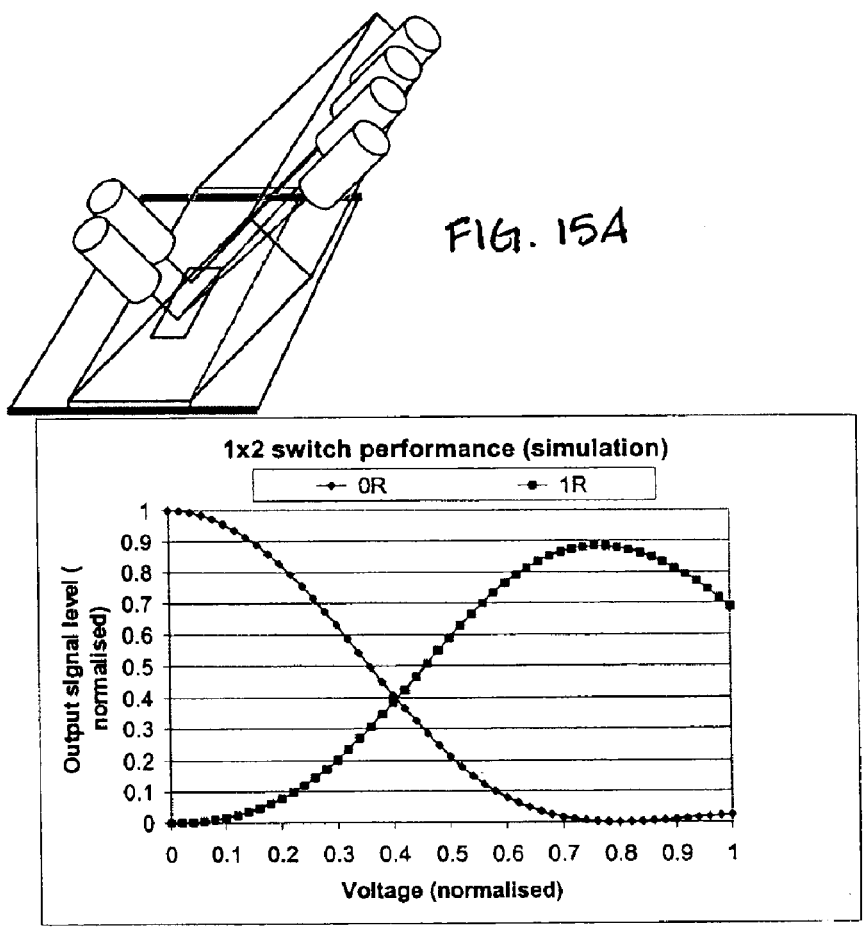
FIG. 15A is an illustration of a 1×2 switch.
FIG. 15B is a graphical illustration of the output signal level as a function of voltage for the $0^{th}$ order and $1^{st}$ order of the 1×2 switch of FIG. 15A.

Forming a blazed grating (as described above), provides the opportunity to improve these characteristics dramatically, with up to 90% efficiency in the selected 1$^{st}$ order (see FIG. 15B).

Dynamic Gain Equalizer

Figure 16:
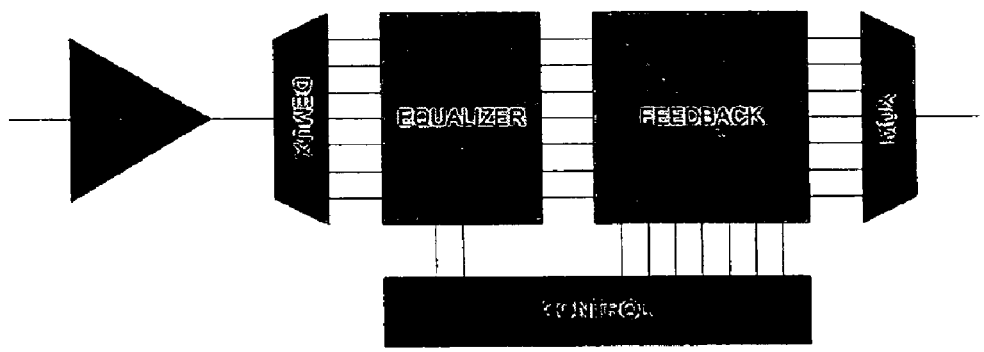
FIG. 16 is a block diagram of a DGE element with an integrated VOA element.

A channel equalizer, or a gain flattening device, can be made as a combination of a free-space demux and a VOA array. The channel equalizer comprises the VOA element in combination with a demux element, such as a diffraction grating or a thin film filter, which disperses the optical signal so that individual wavelengths are separated in space. One embodiment of the DGE element with the VOA element integrated is illustrated in FIG. 16.

R-OADM—Reconfigurable Optical Add-Drop Multiplexer

Figure 17:
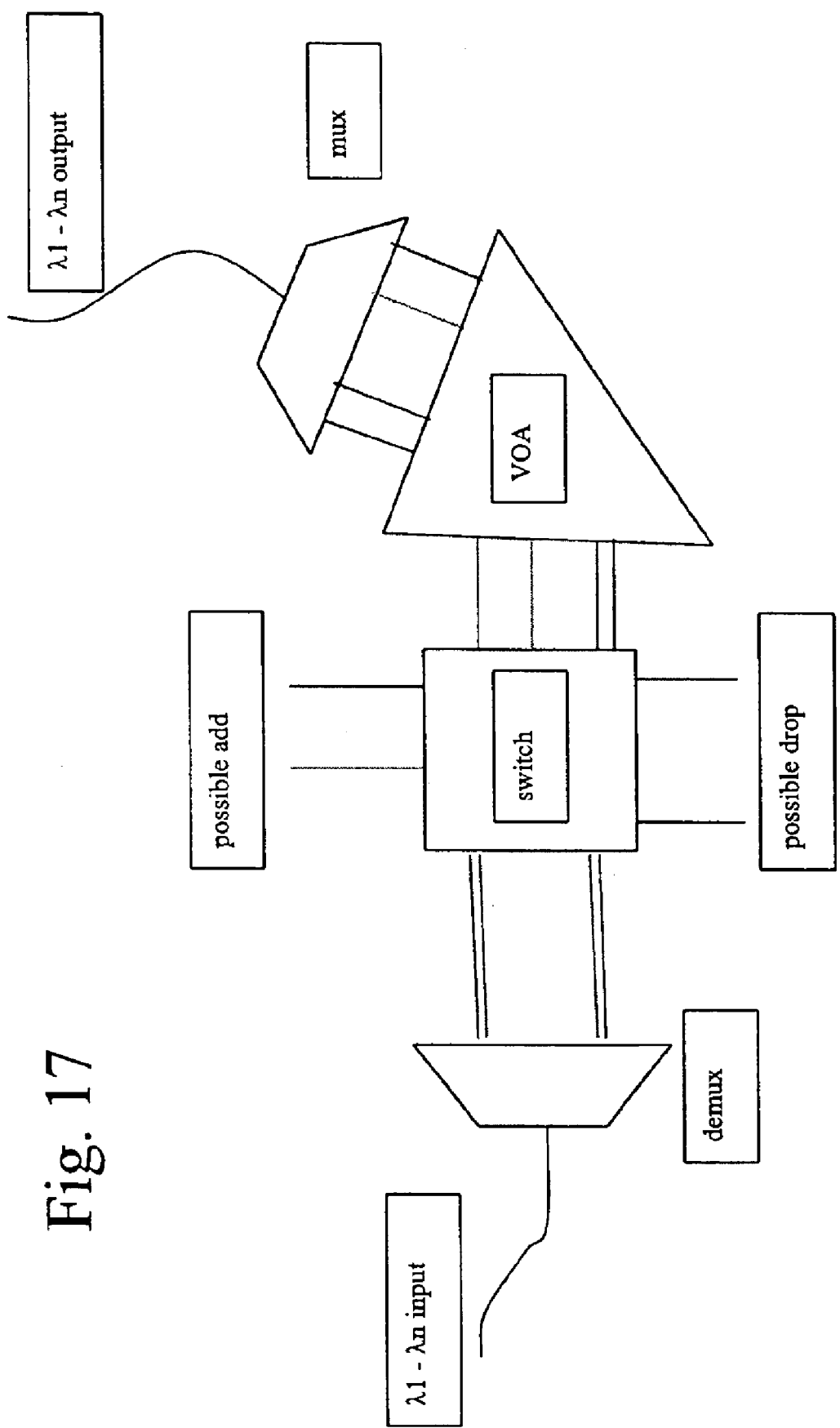
FIG. 17 is a block diagram of one embodiment of a VOA and switch.

Since the nature of the gel modulator is free-space, it is possible to do a hybrid integration of multiple optical functions (mux/demux, switch array and VOA array) to build an R-OADM. One embodiment of an R-OADM hybrid device is shown in FIG. 17.

Monitoring Devices

The diffraction principle is suitable for monitoring applications, e.g., by using one of the 1$^{st}$ orders as monitoring output, while the modulator also provides some other optical function. Optical Channel Monitors (OCM's) may also be implemented by using calibrated detectors on the taps in the feedback system.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of modulating light in an optical communication system comprising:

transmitting light through a gel membrane positioned adjacent to a surface of a transparent prism, wherein a plurality of individually addressable electrodes are positioned on a substrate opposite the prism and spaced apart from a surface of the gel membrane such that a gap exists between the electrodes and the surface of the gel membrane;

applying an excitation voltage to each electrode, thereby generating a wave pattern on a surface of the gel membrane superimposed on an initial state of the gel membrane; and regulating the excitation voltages applied to the electrodes such that the gel membrane returns to the initial state in response to removal of the excitation voltages.

2. The method of claim 1, further comprising providing light to or receiving light from the optical communication system through an optical fiber attached to the prism.

3. The method of claim 1, wherein the prism is positioned over the substrate such that a direction of the prism top is perpendicular to a direction of the electrodes on the substrate.

4. The method of claim 1, wherein the prism is positioned over the substrate such that a direction of the prism top is parallel to a direction of the electrodes on the substrate.

5. A device for modulating light in an optical communication system, comprising:

a prism transmitting light to/from the optical communication system;

a gel membrane positioned adjacent to a surface of the prism;

a substrate having a plurality of individually addressable electrodes located at a distance from a surface of the gel membrane opposite the prism surface, wherein a gap exists between the electrodes and the surface of the gel membrane;

an excitation voltage source configured to provide regulated excitation voltage to each of the plurality of electrodes, and configured to generate a wave pattern on a surface of the gel membrane superimposed on an initial state of the gel membrane, wherein the excitation voltage source comprises a compensating device configured to cause the gel membrane to return to the initial state upon removal of the excitation voltages.

6. The device of claim 5, further comprising at least one optical fiber attached to the prism and configured to provide light to/from the optical communication system.

7. The device of claim 5, wherein the prism is positioned over the substrate such that a direction of the prism top is perpendicular to the electrodes on the substrate.

8. The device of claim 5, wherein the prism is positioned over the substrate such that the direction of the prism top is parallel to the electrodes on the substrate.

9. The device of claim 5, wherein the excitation voltage source is further configured to provide different voltages to each of the plurality of electrodes.

10. The device of claim 5, wherein the excitation voltage source is further configured to provide individual voltages to each of the plurality of electrodes.

11. The device of claim 5, wherein the electrodes are arranged in at least three adjacent parallel rows comprising equal numbers of addressable electrodes, thereby configured to generate at least three wave patterns at the same time on the surface of the gel membrane, and thereby providing a means of optically summing reflected or attenuated light from at least the three wave patterns on the gel membrane.

12. The device of claim 5, wherein every other electrode on the substrate is connected to ground while a voltage is applied to the other electrodes, and wherein the arrangement is periodically reversed such that a voltage is applied to the grounded electrodes while the other electrodes are grounded.

13. The device of claim 5, further comprising a photodiode or a phototransistor configured to measure a level of light output from the prism, and further configured to provide a correction signal to the compensating device.

14. The device of claim 5, comprising a memory of target voltages for the plurality of electrodes, wherein the memory is in communication with the compensating device.

\* \* \* \* \*

UNITED STATES PATENT AND TRADEMARK OFFICE
CERTIFICATE OF CORRECTION

PATENT NO. : 6,897,995 B2
DATED : May 24, 2005
INVENTOR(S) : Malthe-Sorenssen et al.

It is certified that error appears in the above-identified patent and that said Letters Patent is hereby corrected as shown below:

Title page,
Item [75], Inventor, delete "Trond Natestad" and insert therefore -- Trond Naterstad --

Signed and Sealed this

Ninth Day of August, 2005

JON W. DUDAS
*Director of the United States Patent and Trademark Office*